United States Patent
Xam-Mar Mangrane

(10) Patent No.: US 11,457,999 B2
(45) Date of Patent: Oct. 4, 2022

(54) INTRAORAL SCANNING DEVICE FOR DIGITALLY RECORDING THE POSITION OF A DENTAL IMPLANT BY MEANS OF A SCANNER

(71) Applicant: TALLADIUM ESPANA, S.L., Lleida (ES)

(72) Inventor: Esteban Xam-Mar Mangrane, Lleida (ES)

(73) Assignee: TALLADIUM ESPANA, S.L., Lleida (ES)

( * ) Notice: Subject to any disclaimer, the term of this patent is extended or adjusted under 35 U.S.C. 154(b) by 1080 days.

(21) Appl. No.: 16/078,145

(22) PCT Filed: Nov. 14, 2016

(86) PCT No.: PCT/ES2016/070811
§ 371 (c)(1),
(2) Date: Aug. 21, 2018

(87) PCT Pub. No.: WO2017/153617
PCT Pub. Date: Sep. 14, 2017

(65) Prior Publication Data
US 2021/0186669 A1    Jun. 24, 2021

(30) Foreign Application Priority Data
Mar. 8, 2016  (ES) .............................. ES201630299U

(51) Int. Cl.
*A61C 9/00*       (2006.01)
(52) U.S. Cl.
CPC .................................. *A61C 9/0053* (2013.01)
(58) Field of Classification Search
CPC ...... A61C 9/0053; A61C 9/0046; A61C 9/004
USPC ............................................................ 433/25
See application file for complete search history.

(56) References Cited

U.S. PATENT DOCUMENTS

2011/0020764 A1*  1/2011  Weber ................ A61C 13/0027
                                                                433/49
2015/0265372 A1    9/2015  Kim et al.

FOREIGN PATENT DOCUMENTS

| DE | 10 2011 014 664 A1 | 3/2012 |
| EP | 2 685 928 B1 | 5/2015 |
| ES | 1 077 535 U | 8/2012 |
| WO | 2013/061175 A1 | 5/2013 |

OTHER PUBLICATIONS

International Search Report of PCT/ES2016/070811 dated Feb. 14, 2017 [PCT/ISA/210].

* cited by examiner

*Primary Examiner* — Nicholas D Lucchesi
*Assistant Examiner* — Mirayda A Aponte
(74) *Attorney, Agent, or Firm* — Sughrue Mion, PLLC

(57) ABSTRACT

The invention relates to an intraoral scanning device for digitally recording the position of a dental implant by means of a scanner. The device is in the form of a scanning body or pillar used to transfer virtually to CAD software the position and orientation of a dental implant or similar element, mainly by mounting the scanning body or pillar directly on the dental implant located in the mouth of the patient in a clinic and scanning the implant with an intraoral scanner. It is also possible to use the intraoral scanning pillar system in a laboratory and with a conventional desktop scanner.

13 Claims, 6 Drawing Sheets

INTRAORAL SCANNING DEVICE FOR DIGITALLY RECORDING THE POSITION OF A DENTAL IMPLANT BY MEANS OF A SCANNER

CROSS REFERENCE TO RELATED APPLICATIONS

This application is a National Stage of International Application No. PCT/ES2016/070811, filed Nov. 14, 2016, claiming priority based on Spanish Patent Application No. 0201630299, filed Mar. 8, 2016, the contents of all of which are incorporated herein by reference in their entirety.

OBJECT OF THE INVENTION

The present invention relates to an intraoral scanning device for digitally recording the position of a dental implant by means of a scanner. The device is in the form of a scanning body or pillar used to transfer virtually to CAD software the position and orientation of a dental implant or similar element, mainly by mounting the scanning body or pillar directly on the dental implant located in the mouth of the patient in a clinic and scanning the implant with an intraoral scanner. It is also possible to use the intraoral scanning pillar system in a laboratory and with a conventional desktop scanner.

The device object of the present invention is used in the field of dental implantology.

BACKGROUND OF THE INVENTION

Dental restorations, such as crowns and bridges, mounted to dental implants are designed and manufactured based on digitalization by means of a scanner, among other methods. Digitalization, done either directly on the mouth of a patient or more conventionally by means of an impression of the patient's mouth, allows the design of dental structures to be made with highly precise adjustments and a quality far superior to that of traditional casting systems.

The scanner takes a reading of the surfaces of the scanning body or pillar, which, due to the fact that it is fixed in one position to the implant, provides information with regard to the situation and orientation of the same.

European patent number EP2685928B1 presents an intraoral scanning pillar, also called intraoral scanbody, recognized for having a digital scanning system for transferring the position of the dental implant. This pillar comprises at least an upper part recognition by the scanning system, made of a non-metal material, such as a ceramic or PEEK polymer, Teflon or POM, a lower part made of metal in order to fasten the intraoral scanbody to the implant, and an encapsulated screw between the non-metal upper part and the metal lower part, having an upper opening in order to allow access to the screw head by means of a screwdriver to fasten the intraoral scanbody to the implant or analog. The characteristics of this system provide poor precision in the scanning process since the hole provided for the insertion of the screw driver in the upper part considerably reduces the scanning surface of the intraoral scanbody, considerably affecting the precision of the same.

Utility model ES1077535U in Spain provides a solution for the problems in the reading caused by this hole by connecting the scanbody or pillar or intraoral scanning body to an intermediate piece instead of directly to the implant. This intermediate piece is fixed to the implant by means of a screw, and furthermore the intraoral scanbody is coupled to this connection element by means of mechanical retention. The fact that the intraoral scanbody or scanning body is not directly resting against the implant, but rather against an intermediate element creates a new error in the digitalization or scanning, affecting the three-dimensional position of the implant once again.

The device object of the present invention aims to solve the existing problems in the state of the art.

DESCRIPTION OF THE INVENTION

In light of the foregoing, the object of the present invention is an intraoral scanning device for digitally recording the position of a dental implant by means of a scanner, according to claim 1.

The device object of the invention is able to offer greater precision in digitally recording implants or similar laboratory elements. Likewise, the device makes it possible to intraorally manipulate the scanning body or pillar or intraoral scanbody, taking into account the added difficulty in managing these devices in the mouth of a patient and the fact that they are not present in models made using the technique of laboratory impressions.

Thus, the scanning device, which is the object of the invention, is used to transfer the three-dimensional position of an implant or similar laboratory element to CAD/CAM software with greater precision, as well as to simplify the number of scanning pillars or scanning bodies, given that a single pillar or body can be used for different types of implants. Said device comprises a scanning body or pillar, identified by the type of scanning body or pillar according to a classification based on compatibility with different implant models, and a connection and joining element between said scanning body and dental implant or similar element that connects by the lower end thereof to the dental implant, and at the same time protrudes and connects by the upper end thereof to said pillar or scanning body, ensuring connection and attachment between said dental implant and the scanning body or pillar, including magnets inserted in a permanent way inside the scanning body or pillar and in the upper end of the connection and joining element. This device enables one to join and to considerably reduce the scanning bodies or pillars, since if this were not the case, it would be necessary to develop a different type of scanning body for each type of dental implant connection.

The previous device is used when the dental implant has outer coupling means for coupling the scanning pillar, which comprises inner coupling means that are complementary to those of the dental implant. However, when the dental implant comprises inner connection means, it is necessary to include a converter element, or guide screw, in the scanning device object of the invention, placed between said scanning body or pillar and the implant, while the connection and joining element passes through the same. Said converter element connects by the lower side thereof to the dental implant and at the upper side thereof it projects and connects to said scanning body or pillar, using the reference of the geometry of the implant with a reference plane above said scanning body or pillar for the implants with inner coupling means. By means of this element it is possible, when the implant only comprises inner coupling means, for the scanning body or pillar, also with inner coupling means, to couple to said pillar due to the fact that the converter element transforms the inner coupling means of the dental implant to outer coupling means. As was previously mentioned, the outer and inner coupling means are complementary, preferably polygonal and even more preferably hexagonal.

The scanning body or pillar consists of a main body with an outer surface with a region that is able to be scanned, an inner part for the housing and retention in the connection element by fastening means, and coupling means that will prevent the rotation of the scanning pillar with respect to the dental implant once coupled.

The scanning pillar can be made with different heights, preferably between 8 mm and 15 mm, the latter being suitable for cases in which excessive insertion of the dental implant does not allow for an ideal reading of the intraoral scanning body. The main differentiating element of the present invention, and which provides greater advantages in scanning precision, is that although retention is done through a connection element, the scanning pillar is adjusted directly on the dental implant or similar element, thereby preventing added error in recording the position of the implant when the same and the scanning pillar are not in direct contact but rather in contact by means of an intermediate piece. This is such because each scanning body or pillar will be certified in its length, the most important dimension, since a proper passive adjustment between implants and the prosthesis, result of the process, depends on the same. In addition, this characteristic has an added advantage, since for a single implant, scanning bodies of different heights can be easily exchanged, due to the fact that the converter element is the same. This allows for an easy adaption of the invention to the category of each patient, since once one assembly is adjusted, made up of the connection element and the converter, different scanning bodies may be placed in the patient's mouth, and the most suitable may be selected based on how deeply inserted the implant is.

This connection and joining element, preferably made up of an elongated element, has two differentiated parts, a lower end for fastening to the implant by means of a thread, and an upper element for fastening to the scanning body or pillar, the fastening of which is done by means of a magnet. Likewise, the design of the upper end facilitates a first manual adjustment of the connection element to the dental implant, without needing to use additional tools, which is highly beneficial when working in an interoral fashion.

Likewise, the converter element has a lower part with a geometry in the shape of the dental implant coupling means and an upper part also with a geometry in the shape of the coupling means of the scanning body or pillar that associates the position of the implant to the scanning body or pillar. The fastening or coupling between the scanning body or pillar and the converter element has the function of preventing the rotation of said scanning body with respect to the dental implant, but in no case is the intraoral scanning body or pillar resting against the converter element. Therefore, in this way the function of the converter element is to allow the position of the faces of the dental implant connection to be known. Alternatively, the shape of the lower end, which prevents rotation on the implant, can be substituted by a circular shape that allows rotation on the implant.

Additionally, and mainly in cases in which the material of the scanning pillar does not have magnetic properties, on the inside of the hole of said scanning body or pillar a magnet is introduced that will interact with the magnet of the connection element.

BRIEF DESCRIPTION OF THE FIGURES

The invention is described in a more detailed manner below, and therefore the following figures are included with the aim of providing a better understanding of the same.

DETAILED DESCRIPTION OF AN EMBODIMENT OF THE INVENTION

In light of the aforementioned figures, a description of a preferred embodiment of the present invention is provided below.

Figure 1:
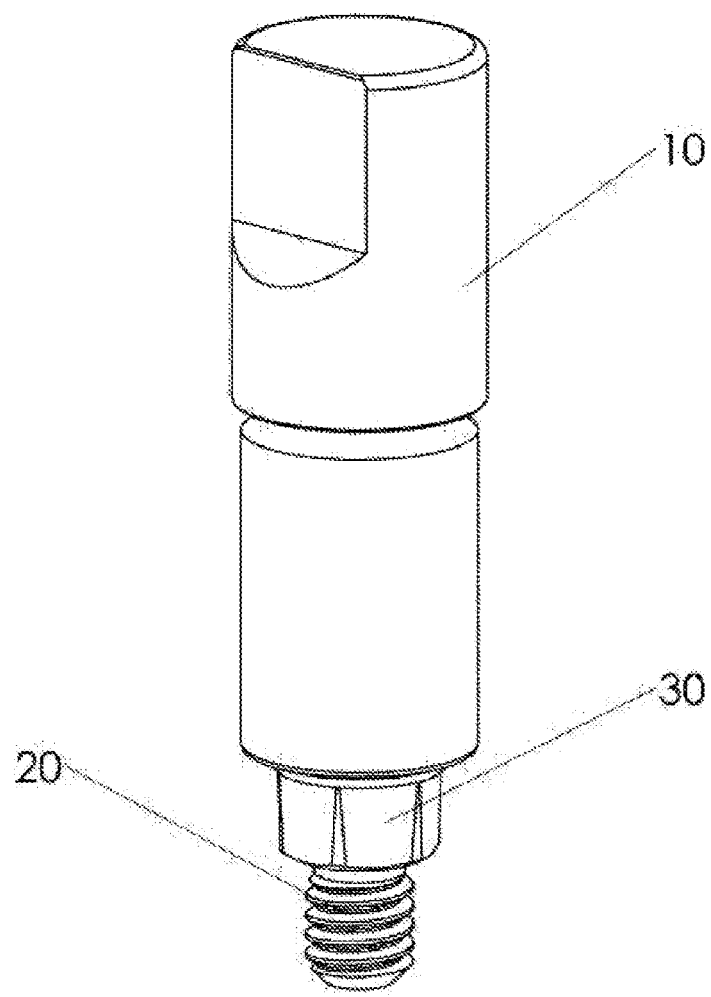
FIG. 1 shows a perspective view of the device assembly object of the invention made up of the scanning body or pillar, the converter and the connection element.

FIG. 1 shows a scanning body or pillar 10, a connection element 20 with means for fastening the scanning pillar 10 to the implant 50 and a converter element 30 that fastens the position of the scanning body or pillar 10 with respect to the implant 50.

Figure 2:
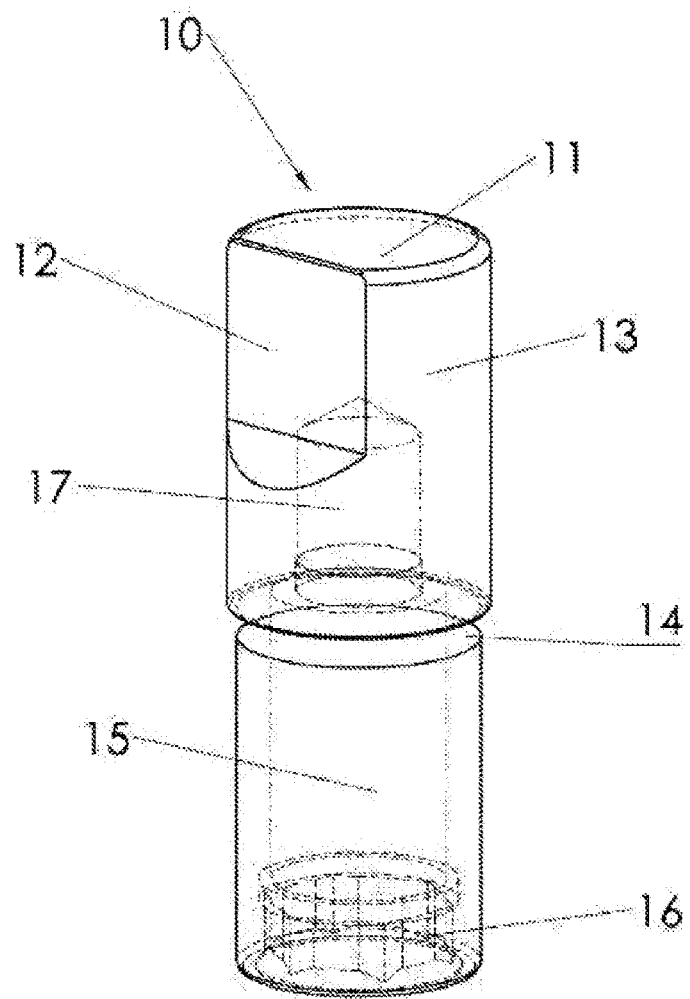
FIG. 2 shows a perspective view of the scanning body or pillar, responsible for digitally recording the implant or similar element.

The scanning body or pillar 10, shown in FIG. 2, has the function of capturing the position of the dental implant 50 or the similar element, the same being fastened in the mouth of the patient. By using a dental scanner, the scanning body or pillar 10 will optically record the digital information for the subsequent manufacturing of the pillars, crowns and bridges by means of CAD/CAM technology. The materials used in the manufacturing of the scanning body or pillar 10 are preferably a single material, bio-compatible metal, or non-metal, or a compound of both, or PEEK polymers, or ceramic.

In the present embodiment, the scanning pillar 10 has been manufactured using a material without magnetic properties, such as titanium, and as a result of the lack of magnetic properties of this material, a magnet 17 is incorporated on the inside of the cavity of the pillar 10. This magnet 17 will cause a magnetic pull with a magnet 24 housed in the connection element 20, such that since the opposite ends of the poles are facing each other, the necessary magnetic pull will be exerted for a correct adjustment of the scanning pillar 10 to the implant 50, as will be explained in detail below. The fact that the magnetic pull takes place between two magnets 17, 24 adds an advantage in that the force of the pull is greater than in the case when said force is between a magnet 24 and ferromagnetic material, of which the scanning body or pillar 10 is made.

The scanning body 10, preferably with a cylindrical make-up, comprises at least in the lower part thereof a hollow 15, also preferably cylindrical, an outer scanning surface and a lower end with a support surface. On the upper part of the outer surface, the same preferably comprises three scanning surfaces, a first surface 11 that defines the height at which the implant 50 is situated, a second surface 12 that provides information on how the implant 50 is oriented based on the orientation of the faces thereof, and a third surface 13 that defines the position of the scanning body 10 in the horizontal plane. These three scanning surfaces 11, 12, 13 allow the implant 50 to therefore be completely defined by the reading taken by the scanner. Additionally, the outer surface of the scanning body 10 has a mark 14 that provides information with regard to the minimal upper surface the scanner needs for a correct reading, and therefore the mark 14 must be accessible to the scanner. In scenarios in which the mark 14 were not readable by the scanner, a situation which could occur in cases in which the implant 50 is deeply below the gingiva, a scanning body or pillar 10 with a greater height could be used. Likewise, the mark 14, formed by a radius on the surface of the scanning pillar 10, has a second function, which is to prevent the patient from accidentally sucking in the scanning pillar 10, since said pillar 10 will be tied with a surgical suture.

As was previously mentioned, the hollow of the scanning body or pillar 10 comprises a housing for the aforementioned magnet 17.

The lower end of the cylindrical hollow 15 of the scanning body or pillar 10 comprises inner coupling means 16, preferably in a polygonal shape, preferably hexagonal, and a support surface that will serve for the subsequent support of the scanning body or pillar 10 on the implant 50. Said inner coupling means 16 are complementary with the outer coupling means 31 of the converter element 30 or of the dental implant 50.

Figure 3:
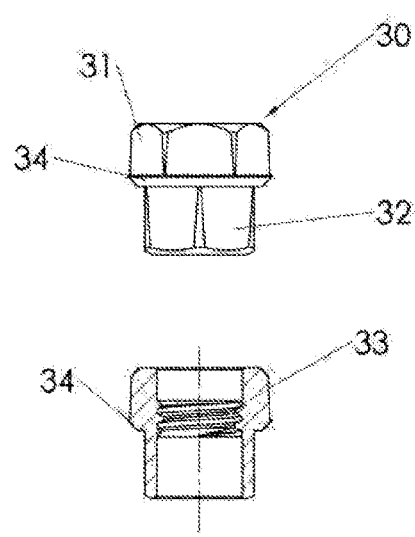
FIG. 3 shows an elevation view and a cross section of the converter element.

The converter element 30, FIG. 3, arranged in the device, comprises two parts separated by an outer flap or ring 34, one upper flap, which also corresponds to the outer coupling means 31, and one lower flap 32, as outer coupling means, each one of the two parts 31, 32 having a polygonal configuration, preferably hexagonal, of the same dimension or of a different dimension. This element 30 is similar to the arrangement of a nut 31 on another 32 with an outer flap, ring or protrusion 34 separating both nuts 31, 32. Likewise the converter element 30 has a through hole 33 with an inner thread, situated approximately at the height of the outer ring or protrusion 34. The lower part 32 will couple to the inner coupling means of the dental implant 50 and the upper part will couple to the inner couplings 16 of the scan body or pillar 10.

Figures 4A, 4B:
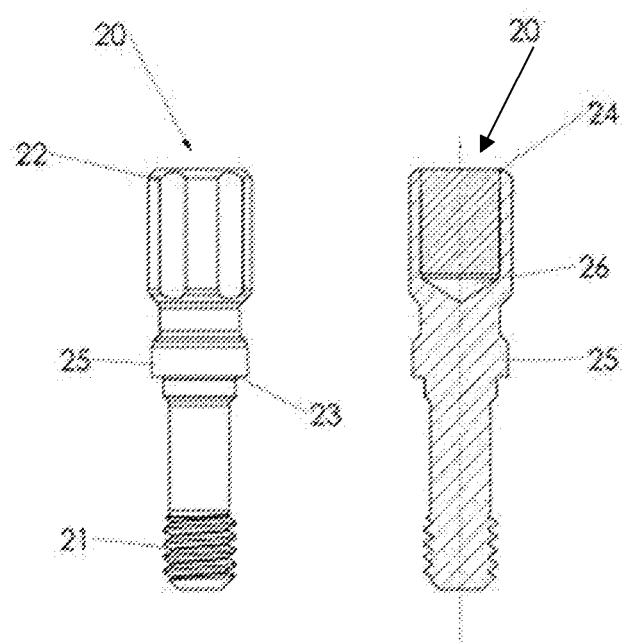
FIGS. 4a and 4b show shows an elevation view and a cross section of the connection element.

The connection element 20, FIGS. 4a and 4b, is an elongated element with a threaded lower end 21, an intermediate protrusion 25 with a flat support surface 23 and a protrusion 22 as a gripping or fastening element near the upper end and an upper cavity 26 in said upper end. Said protrusion 22 comprises a geometry that allows for a first manual adjustment of the implant 50 or replica of the implant, at the same time the design enables the coupling of a ratchet wrench adaptor in the case that one wants to apply a more precise torque. The upper cavity 26 allows for the insertion of a magnet 24 in the upper end of the connection element 20.

Figure 5:
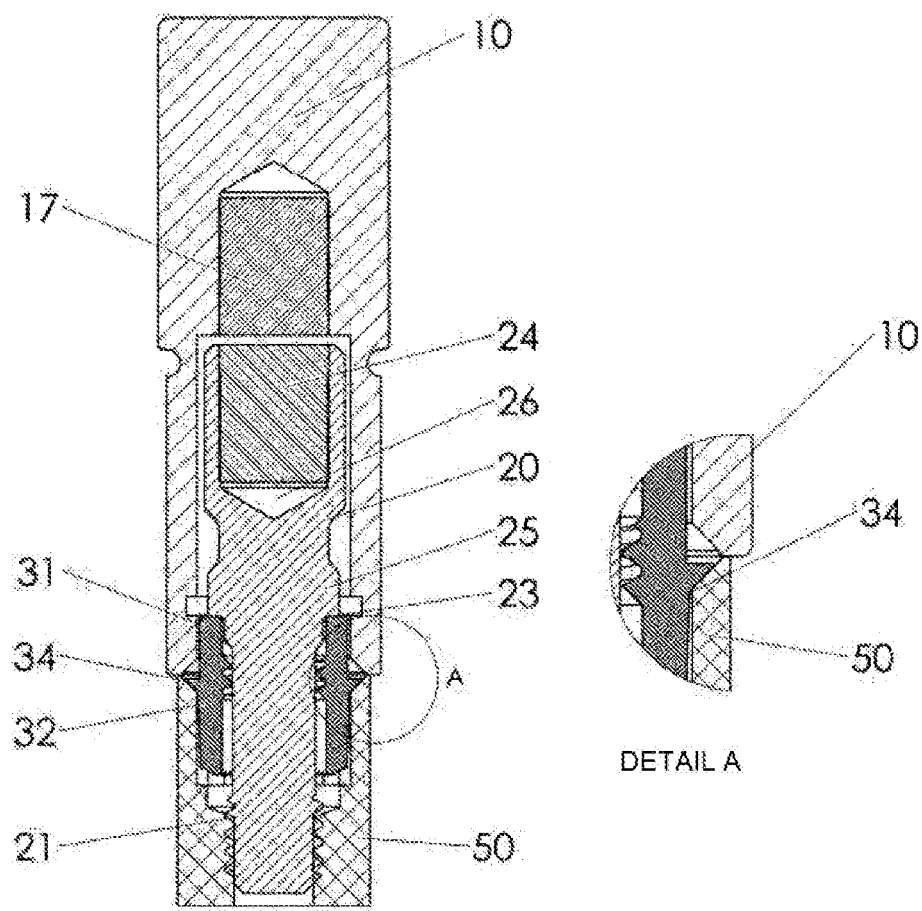
FIG. 5 shows a cross section of the device assembly, assembled in a dental implant with inner coupling means.
Figures 6, 7:
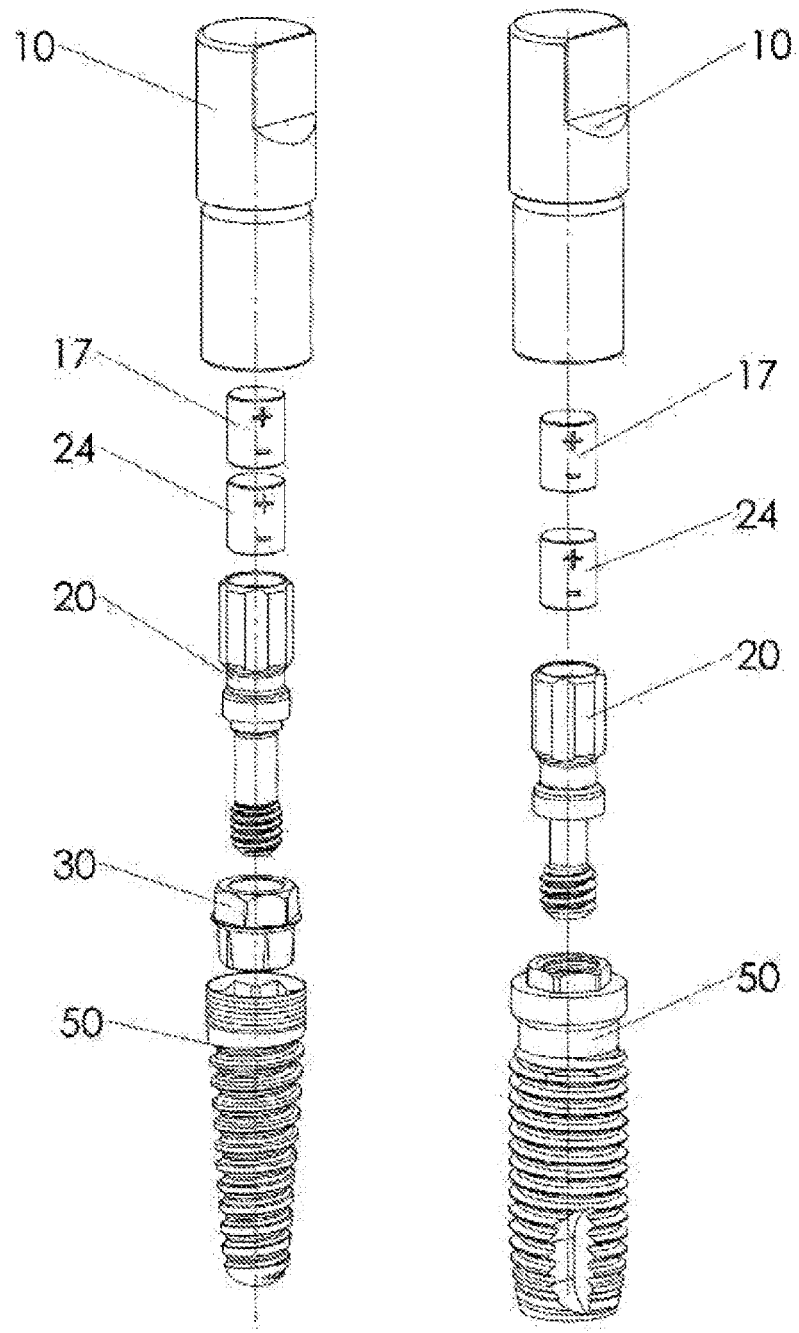
FIG. 6 is an exploded view of the object of the invention of FIG. 5.
FIG. 7 shows an exploded view of the device object of the invention to be assembled in a dental implant with outer coupling means.

For installing the device object of the invention in the dental pillar 50, according to FIGS. 5 and 6, the lower end of the connection element 20 is first introduced in the through hole of the converter element 30, such that after passing said threaded end 14 through the inner thread of the converter element 30, the same stays between the flat support surface 23 and the threaded end 21 of the connection element 20.

The connection element 20 with the converter element 30 then screws to the inside of the implant 50, such that in a first positioning the connection element 20 is manually threaded inside the implant 50 while the polygonal lower part 32 of the converter element 30 is introduced in the dental implant 50, coupling together. To this end, the upper protrusion 22 with a regular geometry of the connection element 20 is manually secured and turned so that the threaded end 21 of said connection element 20 screws into the corresponding housing of the implant 50 until the protruding rim or ring 34 of the converter element 30 rests against a part of the upper surface of the implant 50. Likewise, the upper surface of the polygonal upper part 31 rests against the flat support surface 23 of the connection element 20. This construction allows these components to be manually manipulated inside the mouth of the patient. Then, for a definitive positioning, using an appropriate tool, the connection element 20, with the converter element 30, will be adjusted using necessary force in the implant 50.

For a correct positioning of the converter element 30 on the implant 50, the upper surface of the implant 50 and the surface of the outer ring, flap or protrusion 34 of the converter element 30 are complementary and preferably chamfered, so that the diameter of the outer ring, flap or protrusion 34 is smaller than the maximum diameter of the implant 50. This way, there is always a part of the upper surface of the implant 50 that is free, in other words it is not occupied by the ring, flap or protrusion 34 of the converter element 30.

Once the connection element 20 and the converter element 30 are installed in the implant 50, the scanning body or pillar 10 is then placed on said connection element 30. To do so, the faces of the polygonal, preferably hexagonal, lower end 16 of the cylindrical hollow 15 of said scanning body 10 are aligned to coincide with the faces of the polygonal upper part 31, also hexagonal, of the converter element 30, thereby coupling the inner coupling means 16 of the scanning body or pillar 10 to the outer coupling means 32 of the converter element 30, preventing the rotation of the scanning body or pillar 10 with respect to said converter element 30.

Alternatively, the polygonal form 16 on the lower end of the scanning body 10 for preventing the rotation of the same on the implant 50 can be substituted by a circular shape 16, without a flat surface 12, that does allow for rotation on the converter element 30 and, therefore, also on the implant 50. In this case, the coupling means between the scanning body or pillar 10 and the converter element 30 are not polygonal but rather circular.

Thus, the position of the scanning body or pillar 10 is adjusted on the implant 50, the scanning body or pillar 10 placed on the implant thanks to magnetic pull between the magnet 24 located in the cavity 26 of the connection element 20 and the material of the scanning body 10. Likewise, the surface of the lower end of the scanning body 10 rests directly on the upper surface of the implant, thereby avoiding contact between said inner surface of the scanning body 10 and the connector element 30.

Alternatively, if the material used to make the scanning body or pillar 10 has electromagnetic properties, it does not have to have a housing for a second magnet 17 on the upper end of the hollow 15 that interacts with the magnet 24 arranged on the cavity 26 of the connection element 20.

Therefore, when the scanning body 10 is placed on the connection element 20 and the converter element 30, the scanning body 10, with or without the magnet 17, will be pulled by the magnet 24 of the connection element 20 until the lower part of the scanning body 10 rests against the implant 50 or similar element, thereby allowing the scanning body or pillar 10 to be perfectly defined for the scanning thereof.

This way, the scanning pillar 10 is placed directly on the implant 50 in the mouth of the patient in a clinic, the connection element 20 is screwed to the implant 50, with the converter previously screwed to the connection element 20, such that the converter 30 is correctly placed on the implant 50.

In another preferred embodiment, shown in FIG. 7, one can see a device that does not comprise a converter element 30 since the dental implant on which said device is installed includes outer coupling means that can directly receive the inner coupling means 16 of the scanning body or pillar 10. Said coupling means are preferably polygonal and more preferably hexagonal in order to prevent the rotation of the scanning body or pillar 10 on the dental implant. Alternatively, said coupling means between both elements can be circular to make it possible for the scanning pillar 10 to rotate on the implant 50.

The invention claimed is:

1. An intraoral scanning device for digitally recording the position of an implant for a dental prosthesis by a scanner, the intraoral scanning device comprises:
   a scanning body with an outer upper scanning surface and a lower end with a support surface,
   a connection element, for connecting the implant to the scanning body, with a connection at a lower end of the connection element for connecting to the implant and a housing on an upper end of the connection element for receiving a first magnet, the upper end of the connection element configured to be introduced in the lower end of the scanning body, said first magnet acting as a joint for the scanning body; and
   a converter element located between the scanning body and the implant and through which the lower end of the connection element passes.

2. The device according to claim 1, wherein the scanning body comprises an inner housing to receive a second magnet.

3. The device according to claim 1, wherein the scanning body comprises at least:
   three geometric surfaces on the upper scanning surface in order to allow the implant to be positioned by the scanner, and
   a mark that determines a minimum upper surface for a proper reading by the scanner.

4. The device according to claim 1, wherein the lower end of the scanning body comprises a polygonal shape to prevent rotation on the implant.

5. The device according to claim 1, wherein the lower end of the scanning body comprises a circular shape to allow rotation on the implant.

6. The device according to claim 1, wherein a material of the scanning body is a biocompatible, metal or non-metal material.

7. The device according to claim 1, wherein the material is a titanium metal.

8. The device according to claim 1, wherein the connection element comprises an intermediate protrusion with a flat support surface.

9. The device according to claim 1, wherein the connection element comprises an external protrusion as a gripping or securing element located near the upper end of the connection element.

10. An intraoral scanning device for digitally recording the position of an implant for a dental prosthesis by means of a scanner, the intraoral scanning device comprises:
    a scanning body with an outer upper scanning surface and a lower end with a support surface, a connection element, for connecting the implant to the scanning body, with a connection at a lower end of the connection element for connecting to the implant and a housing on an upper end of the connection element for receiving a magnet, the upper end of the connection element configured to be introduced in the lower end of the scanning body, said magnet acting as a joint for the scanning body; and
    wherein the connection element comprises a thread on the lower end for the fastening thereof to the implant.

11. An intraoral scanning device for digitally recording the position of an implant for a dental prosthesis by means of a scanner, the intraoral scanning device comprises:
    a scanning body with an outer upper scanning surface and a lower end with a support surface,
    a connection element, for connecting the implant to the scanning body, with a connection at a lower end of the connection element for connecting to the implant and a housing on an upper end of the connection element for receiving a magnet, the upper end of the connection element configured to be introduced in the lower end of the scanning body, said magnet acting as a joint for the scanning body; and
    a converter element located between the scanning body and the implant and through which the lower end of the connection element passes, and wherein the converter element comprises an upper part, a lower part, and a through hole, wherein the upper part of the converter element is separated from the lower part by a flap.

12. The device, according to claim 11, wherein each of the upper part and the lower part of the converter element has a polygonal configuration.

13. An intraoral scanning device for digitally recording the position of an implant for a dental prosthesis by a scanner, the intraoral scanning device comprises:
    a scanning body with an outer upper scanning surface and a lower end with a support surface;
    a connection element, for connecting the implant to the scanning body, with a connection at a lower end of the connection element for connecting to the implant and a housing on an upper end of the connection element for receiving a magnet, the upper end of the connection element configured to be introduced in the lower end of the scanning body, the magnet configured to join with an opposing magnet in the scanning body;
    wherein the connection element and the scanning body are distinct parts configured to be assembled by having a portion of the connection element inserted into the scanning body.

* * * * *